(12) United States Patent
Arora et al.

(10) Patent No.: US 11,423,367 B2
(45) Date of Patent: Aug. 23, 2022

(54) METHOD AND SYSTEM FOR SECURING TRANSACTIONS BY CHECK USING BLOCKCHAIN TECHNOLOGY

(71) Applicant: MASTERCARD INTERNATIONAL INCORPORATED, Purchase, NY (US)

(72) Inventors: Ankur Arora, New Delhi (IN); Avinash Kumar, Bokaro (IN); Rakesh Patel, Haryana (IN)

(73) Assignee: MASTERCARD INTERNATIOANL INCORPORATED, Purchase, NY (US)

( * ) Notice: Subject to any disclaimer, the term of this patent is extended or adjusted under 35 U.S.C. 154(b) by 581 days.

(21) Appl. No.: 15/968,818

(22) Filed: May 2, 2018

(65) Prior Publication Data

US 2019/0340584 A1   Nov. 7, 2019

(51) Int. Cl.
*G06Q 20/04* (2012.01)
*G06Q 20/38* (2012.01)
*G06K 7/14* (2006.01)

(52) U.S. Cl.
CPC ......... *G06Q 20/042* (2013.01); *G06K 7/1417* (2013.01); *G06Q 20/3825* (2013.01); *G06Q 20/3829* (2013.01); *G06Q 2220/00* (2013.01)

(58) Field of Classification Search
CPC ............. G06Q 20/042; G06Q 20/3825; G06Q 20/3829; G06Q 2220/00; G06Q 20/00–425; G06K 7/1417; G06K 7/00–1495
See application file for complete search history.

(56) References Cited

U.S. PATENT DOCUMENTS

| | | | |
|---|---|---|---|
| 9,855,785 B1 * | 1/2018 | Nagelberg | G06K 7/10722 |
| 10,423,938 B1 * | 9/2019 | Gaeta | G06Q 20/4016 |
| 2010/0082444 A1 * | 4/2010 | Lin | G06Q 20/042 705/17 |
| 2013/0185214 A1 * | 7/2013 | Azen | G06Q 20/3272 705/76 |
| 2017/0214699 A1 * | 7/2017 | Johnsrud | H04L 9/3239 |
| 2017/0344988 A1 * | 11/2017 | Cusden | H04L 9/3247 |
| 2019/0043023 A1 * | 2/2019 | Kurian | G06Q 20/042 |

* cited by examiner

*Primary Examiner* — Mohammad A. Nilforoush
(74) *Attorney, Agent, or Firm* — Panitch Schwarze Belisario & Nadel LLP

(57) ABSTRACT

A method for secure approval of a check includes: reading a machine-readable code to obtain a block identifier and a validation value, wherein the machine-readable code is displayed on a physical check and encoded with the block identifier and validation value; receiving a digital signature from an external device; identifying a blockchain data value stored in a blockchain, wherein the blockchain data value includes at least the block identifier and an additional value; validating the received digital signature using a public key; validating the validation value based on a comparison of the validation value to the additional value; and approving use of the physical check to fund a payment transaction upon successful validation of the received digital signature and validation value.

18 Claims, 5 Drawing Sheets

METHOD AND SYSTEM FOR SECURING TRANSACTIONS BY CHECK USING BLOCKCHAIN TECHNOLOGY

FIELD

The present disclosure relates to the securing of transactions paid for using a check, specifically the use of a blockchain and unique values stored therein that are specific to each check to provide additional security in check usage and prevent fraudulent usage of checks.

BACKGROUND

Paper checks and other similar types of payment instruments have been used for many years. Even with the rise in usage of credit cards, electronic wallets, and other more modern payment methods, many consumers still prefer to use checks for the added security and easy ability to keep track of each payment transaction. However, despite the increased security of checks over credit cards in some respects, checks are still vulnerable to theft and forgery.

For instance, various security techniques have been developed to protect against forgery; however, these are implemented with respect to the manufacture and display of the check itself. However, there are very limited protections for checks in cases of theft. In many instances, if the account owner does not report theft before a stolen check is used, recourse is only available after the check has been processed and it can be verified that it was not used at the account owner's request or by the account owner. In some cases, a stolen check may be originally authorized by the account owner with information forged following the theft, such as by changing the payee or the amount. In these cases, it can be even more difficult to prove the theft. Currently, there are no methods or systems that offer any solutions to detecting or preventing such theft or forgery. Thus, there is a need for a technological solution to provide increased security to the use and processing of checks.

SUMMARY

The present disclosure provides a description of systems and methods for securing approval of a check. Each check includes a machine-readable code, such as a quick response (QR) code, displayed thereon that is encoded with a value that is unique to that check. This value is also stored in a blockchain as part of a blockchain transaction at an address that can be traced back to a public key of a cryptographic key pair. In order to use the check, a digital signature generated via the private key of that cryptographic key pair (and thus validated via the corresponding public key) must be provided in addition to the check. The digital signature can be validated using the public key that is associated with the blockchain transaction, where the machine-readable code displayed on the check must be encoded with the same value that is included in that blockchain transaction in order for it to be approved for use. Thus, without possessing the private key to generate the digital signature, or otherwise obtaining the digital signature, a thief or forger of a paper check would be unable to use the check, thereby granting increased security to the check's owner.

A method for secure approval of a check includes: reading, by a reading device interfaced with a computing device, a machine-readable code to obtain a block identifier and a validation value, wherein the machine-readable code is displayed on a physical check and encoded with the block identifier and validation value; receiving, by the computing device, a digital signature from an external device; identifying, by the computing device, a blockchain data value stored in a blockchain, wherein the blockchain data value includes at least the block identifier and an additional value; validating, by the computing device, the received digital signature using a public key; validating, by the computing device, the validation value based on a comparison of the validation value to the additional value; and approving, by the computing device, use of the physical check to fund a payment transaction upon successful validation of the received digital signature and validation value.

A system for secure approval of a check includes: a reading device interfaced with a computing device configured to read a machine-readable code to obtain a block identifier and a validation value, wherein the machine-readable code is displayed on a physical check and encoded with the block identifier and validation value, wherein the computing device is configured to receive a digital signature from an external device, identify a blockchain data value stored in a blockchain, wherein the blockchain data value includes at least the block identifier and an additional value, validate the received digital signature using a public key, validate the validation value based on a comparison of the validation value to the additional value, and approve use of the physical check to fund a payment transaction upon successful validation of the received digital signature and validation value.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
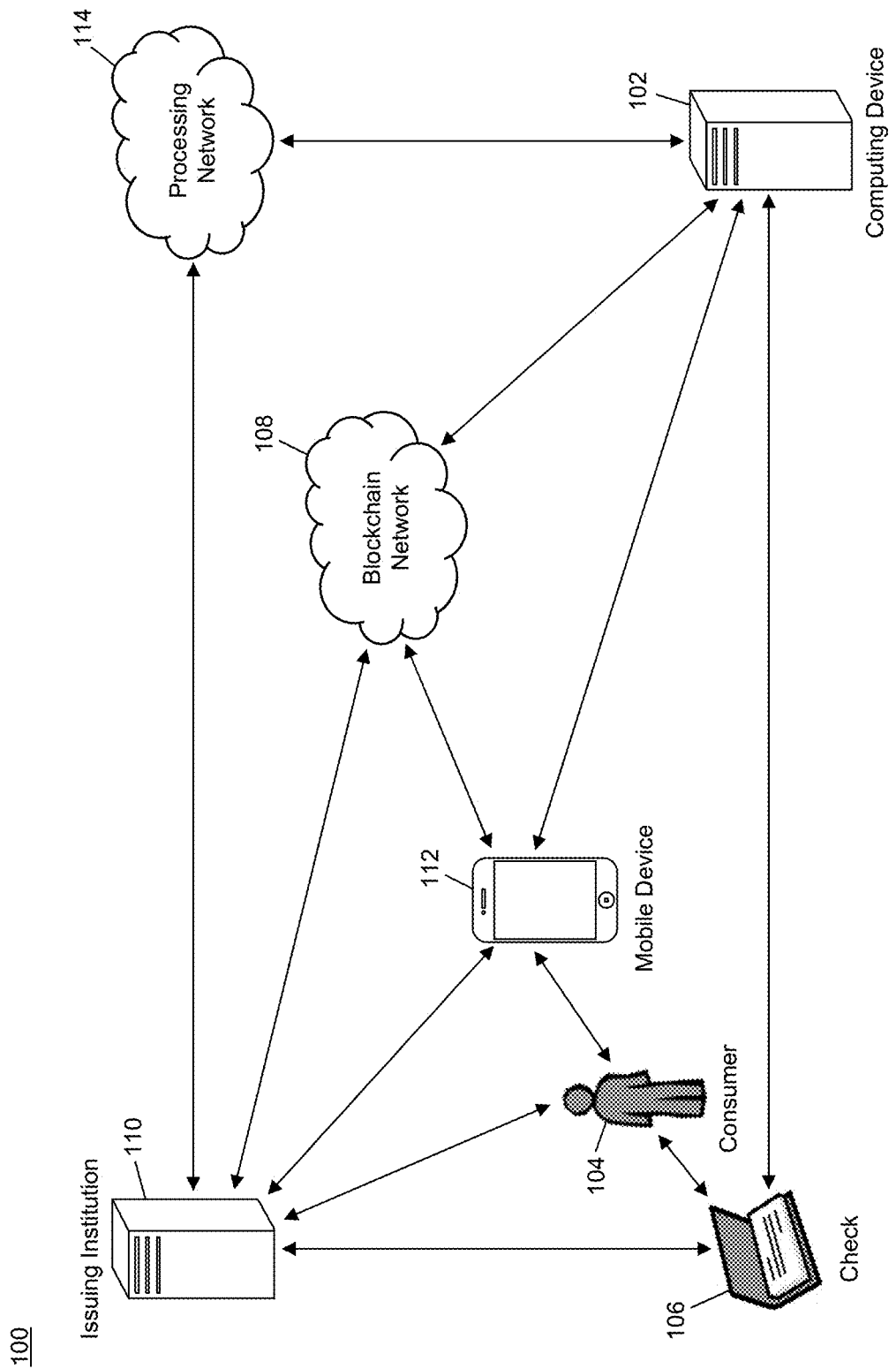
FIG. 1 is a block diagram illustrating a high level system architecture for the secure approval of a check using a blockchain transaction in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

System for Securing Check Approval Via Blockchain

FIG. 1 illustrates a system 100 for securing the approval of a check via the use of a blockchain network and a unique value displayed on each check through a machine-readable code.

The system 100 may include a computing device 102. The computing device 102, discussed in more detail below, may be configured to secure approval (or denial, as applicable) of a check on behalf of a point of sale device or as part of the operation of a point of sale device for use in funding a payment transaction. In some embodiments, the computing device 102 may be the point of sale device itself that is being used in the processing of a payment transaction. In other embodiments, the system 100 may include a separate point of sale device that may be configured to communicate with the computing device 102 to request approval of a check using the methods and systems discussed herein. In such embodiments, the point of sale device may be configured to perform some of the functions of the computing device 102 discussed herein.

In the system 100, a consumer 104 may have a desire to use a check 106 to pay for a payment transaction at a merchant. The check 106 may be issued to the consumer 104 by an issuing institution 110. The issuing institution 110 may be a financial institution, such as an issuing bank, or other entity configured to issue checks that are associated with a transaction account where use of the check will result in funding of a payment transaction via the associated transaction account. In the methods and systems discussed herein, each check 106 may have a machine-readable code printed or otherwise displayed thereon. The machine-readable code may be encoded with a validation value. The validation value may be a value that is unique to the specific check on which its machine-readable code is displayed. The validation value may be a number, alphanumeric value, or other type of value that may be randomly generated, pseudo-random, or generated using any other suitable algorithm or mechanism.

The system 100 may also include a blockchain network 108. The blockchain network 108 may be associated with at least one blockchain and may be comprised of at least a plurality of nodes, where each node, also referred to as a blockchain node, is a computing device specifically configured to store a local copy of the associated blockchain and generate and validate blocks to be added to the blockchain.

The blockchain may be comprised of a plurality of blocks. Each block may include at least a block header and one or more blockchain transactions, also referred to herein as blockchain data values.

Each block header may include at least a timestamp, a block reference value, and a transaction reference value. The timestamp may be a time at which the block header was generated, or other time associated with the creation and addition of the respective block to the blockchain. For instance, it could be the time when the generation process was initiated, or could be a time when the last blockchain data value included in the respective block was processed. The block reference value may be a unique value that refers to an earlier block in the blockchain. In an exemplary embodiment, the block reference value in a block header may be a value that references the block header in the preceding block in the blockchain (e.g., as identified via timestamp). In one embodiment, the block reference value may be a hash value generated via the hashing of the block header of the preceding block. The transaction reference value may be a unique value that refers to the blockchain transactions in the respective block. In one embodiment, the transaction reference value may be a hash value generated via the hashing of the blockchain data values included in the block, such as the root of a Merkle tree generated via the hashing of the blockchain data values. The use of the reference values may ensure immutability of the blockchain as no blockchain transaction may be modified without subsequently modifying the transaction reference value in that block's header, which would necessitate modification to the block reference value in every subsequent block in the blockchain, which changes must be carried out across every single node in the blockchain network 108 prior to a new block being added, thus rendering modification nearly, if not entirely, impossible.

Each blockchain transaction in the blockchain may be related to an issued check 106. Each blockchain transaction may include at least an identification value, referred to herein as a block identifier, and a validation value, where the validation value matches a validation value that is encoded in the machine-readable code displayed on an issued check 106. The block identifier may be a value that is unique to the blockchain transaction, which may be used for identification thereof. The block identifier may be any suitable type of value, including a random number or alphanumeric value. In some embodiments, the block identifier may refer to the block (e.g., or block header thereof) that the blockchain transaction is included in. In such embodiments, each blockchain transaction in a block may include the same block identifier, or there may be a single block identifier stored with the blockchain transactions included in the block. In some cases, a blockchain transaction may also include a blockchain address, which, in some instances, may be the block identifier. A blockchain address may be a value that is generated via a public key of a cryptographic key pair. In some embodiments the blockchain transaction may also, or alternatively, include the public key in a cryptographic key pair. In some embodiments, a blockchain transaction may also be added when a check is used. In such embodiments, the blockchain transaction may store data related to the use of the check, such as the transaction time and/or date, transaction amount, merchant, etc.

When the issuing institution 110 issues new checks 106 to a consumer 104, the issuing institution 110 may electronically transmit the validation values encoded in the machine-readable code displayed on each check 106 to a node in the blockchain network 108. The node may receive the values and may generate, for each validation value, a new blockchain transaction that may be included in a new block that is generated, validated, and added to the blockchain using traditional methods and systems. In some embodiments, the node may identify the block identifier when generating the new blockchain transactions and/or block, and may provide the block identifier for each of the checks 106 to the issuing institution 110 (e.g., with their validation values for identification). In other embodiments, the issuing institution 110 may supply the block identifiers for each of the validation values being added to the blockchain. In some such embodiments, the issuing institution 110 may possess a public key of a cryptographic key pair associated with the transaction account on which the checks 106 are issued, which may be used to generate the block identifiers for each of the validation values. The machine-readable code displayed or otherwise included on each check 106 may be encoded with the check's validation value as well as its block identifier, such as for identifying the blockchain transaction associated with the check 106.

Once the blockchain includes the validation values for each of the checks 106, the issuing institution 110 may issue the checks 106 to the consumer 104 for use. The consumer 104 may present a check 106 to the computing device 102 (e.g., or to a point of sale in communication with the computing device 102) in order to use the check 106 to fund a payment transaction. In order to secure approval of the check 106, the computing device 102 may also require that the consumer 104 present a digital signature to authenticate that the consumer 104 is authorized to use the check 106. The consumer 104 may possess a mobile computing device 112. The mobile device 112 may be any type of computing device suitable for performing the functions discussed herein, such as a cellular phone, smart phone, smart watch, wearable computing device, implantable computing device, etc. The mobile device 112 may be configured to store a private key of the cryptographic key pair that includes the public key associated with the issued checks 106. In some embodiments, the mobile device 112 may be configured to generate the cryptographic key pair comprised of the private key and public key, and then submit the public key to the issuing institution 110 and/or blockchain network 108 for use in generating the block identifiers or otherwise being stored in blockchain transactions for checks 106 issued to the consumer 104 associated with the mobile device 112.

The mobile device 112 may be configured to generate a digital signature using the private key. The digital signature may be generated using any suitable signature generation algorithm, and the digital signature may be such that it may be verified as being generated by the private key via the corresponding public key in accordance with the signature generation algorithm used in the generation thereof. As part of the use of the check 106 by the consumer 104, the consumer 104 may present the mobile device 112 to the computing device 102 and instruct the mobile device 112 to electronically transmit the digital signature to the computing device 112 using a suitable communication method. For example, the mobile device 112 may transmit the digital signature to the computing device 112 using near field communication, Bluetooth, radio frequency, a local area network, etc., or may display a machine-readable code encoded with the digital signature for reading by the computing device 102.

The computing device 102 may be configured to receive the digital signature and may also read the machine-readable code displayed on the check 106 and decode the validation value and block identifier therefrom. The computing device 102 may then identify the blockchain transaction in the blockchain that corresponds to the check 106, where the blockchain transaction may be identified via the block identifier. In some cases, the computing device 102 may store a local copy of the blockchain and may identify the blockchain transaction in internal memory. In other cases, the computing device 102 may supply the block identifier to a node in the blockchain network 108 and receive the blockchain transaction therefrom. The computing device 102 may be configured to validate the validation value read from the check 106 (e.g., and decoded from the machine-readable code therefrom) by comparing it to the validation value included in the identified blockchain transaction. In addition, the computing device 102 may also validate the digital signature prior to approving use of the check 106. The digital signature may be validated using the public key, which may be the block identifier or otherwise included in the identified blockchain transaction, may be provided by the mobile device 112 with or separately from the digital signature, or decoded from the machine-readable code displayed on the check 104.

If the validation of the validation value and digital signature are both successful, then the check 106 may be approved for use by the computing device 102. The transaction may then be processed using traditional methods and systems by a processing network 114, which may be a payment network or other similar payment processor. As part of the processing, the issuing institution 110 may be informed of the use of the check 106 and may debit the transaction account associated therewith accordingly for the payment transaction. If the validation is unsuccessful, then the computing device 102 (e.g., or a point of sale device as reported to by the computing device 102) may display a message to the consumer 104 and/or a user of the computing device 102 (e.g., an employee of the merchant) that indicates that the validation was unsuccessful. In some embodiments, the computing device 102 may be configured to report unsuccessful validations to the issuing institution 110 or to the consumer's 104 mobile device 112, such as in cases where the unsuccessful validation may indicate potential fraud.

The methods and systems discussed herein thus enable the use of checks 106 for funding payment transactions where the use of a mobile device 112 and blockchain network 108 provides for significant protection against fraud or misuse. Any thief of a check would be required to also present the digital signature, which can only be generated by an authorized device, thus securing the check 106 for the consumer 104. In addition, the check 106 itself cannot be forged as the forger would be unaware of the block identifier and validation value without first reading them from the check 106, and would be unable to create new values as they must be submitted to the blockchain network 108 with proper authorization. Thus, the result is a more secure check 106 that is protected against both theft and forgery using the specifically configured system discussed herein.

Computing Device

Figure 2:
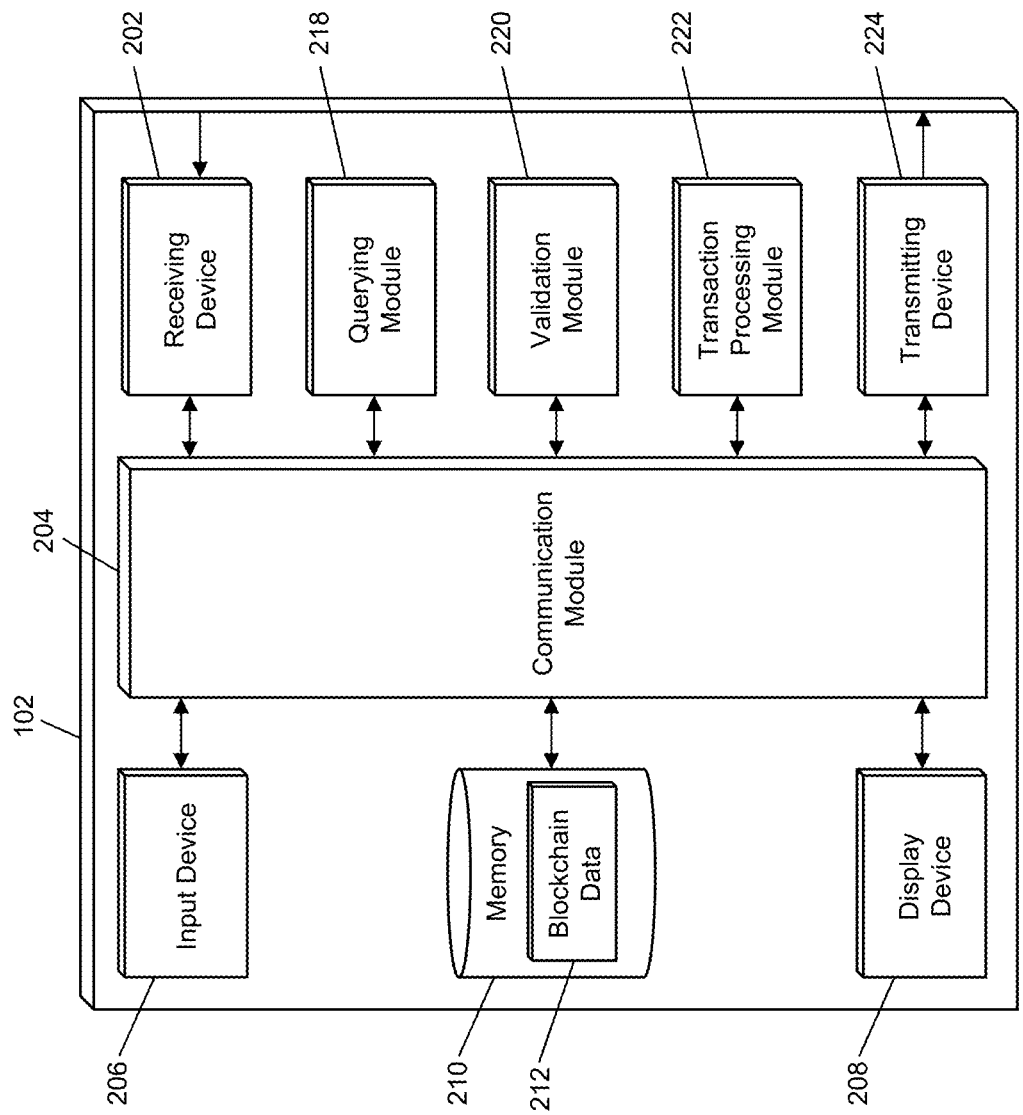
FIG. 2 is a block diagram illustrating the processing server of the system of FIG. 1 for the secure approval of a check using a blockchain transaction in accordance with exemplary embodiments.

FIG. 2 illustrates an embodiment of a computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 500 illustrated in FIG. 5 and discussed in more detail below may be a suitable configuration of the computing device 102.

The computing device 102 may include a receiving device 202. The receiving device 202 may be configured to receive data over one or more networks via one or more network protocols. In some instances, the receiving device 202 may be configured to receive data from mobile devices 112, blockchain networks 108, and processing networks 114, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by a node in the blockchain network 108, which may be superimposed or otherwise encoded with blockchain data. In some cases, the blockchain data may be a blockchain transaction that includes a block identifier as supplied by the computing device 102. In other cases, the blockchain data may include newly generated blocks for use by the computing device 102 in keeping a local copy of the blockchain. In some such embodiments, the computing device 102 may be a node in the blockchain network 108. The receiving device 202 may also be configured to receive data signals electronically transmitted by mobile devices 112, which may be superimposed or otherwise encoded with a digital signature, and may also include a public key. The receiving device 202 may also be configured to receive data signals electronically transmitted by processing networks 114, which may be superimposed or otherwise encoded with data used in the processing of payment transactions funded via check 106, such as messages indicating approval or denial of the use of the check 106, messages indicating successful processing of the payment transaction, etc.

The computing device 102 may also include a communication module 204. The communication module 204 may be configured to transmit data between modules, engines, databases, memories, and other components of the computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include and/or be comprised of a plurality of engines and/or modules specially configured to perform one or more functions of the processing device, such as a querying module 218, validation module 220, transaction processing module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 102 may also include or be otherwise interfaced with one or more input devices 206. The input devices 206 may be internal to the computing device 102 or external to the computing device 102 and connected thereto via one or more connections (e.g., wired or wireless) for the transmission of data to and/or from. The input devices 206 may be configured to receive input from a user of the computing device 102, such as the consumer 104, which may be provided to another module or engine of the computing device 102 (e.g., via the communication module 204) for processing accordingly. Input devices 206 may include any type of input device suitable for receiving input for the performing of the functions discussed herein, such as a keyboard, mouse, click wheel, scroll wheel, microphone, touch screen, track pad, camera, optical imager, etc. The input device 206 may be configured to, for example, read a machine-readable code printed or otherwise displayed on a check 106 to obtain data encoded therein, including a validation value and block identifier.

The computing device 102 may also include or be otherwise interfaced with a display device 208. The display device 208 may be internal to the computing device 102 or external to the computing device 102 and connected thereto via one or more connections (e.g., wired or wireless) for the transmission of data to and/or from. The display device 208 may be configured to display data to a user of the computing device 102, such as the consumer 104. The display device 208 may be any type of display suitable for displaying data as part of the functions discussed herein, such as a liquid crystal display, light emitting diode display, thin film transistor display, capacitive touch display, cathode ray tube display, light projection display, etc. In some instances, the computing device 102 may include multiple display devices 208. The display device 208 may be configured to, for example, display messages indicating successful or unsuccessful approval of use of the check 106 based on the validations discussed herein.

The computing device 102 may also include a memory 210. The memory 210 may be configured to store data for use by the computing device 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein.

The memory 210 may be configured to store blockchain data 212. The blockchain data 212 may include a copy of the blockchain associated with the blockchain network 108 or blocks included therein. In some cases, the blockchain data 212 may include only those blockchain transactions received from nodes in the blockchain network 108 as requested using block identifiers. The memory 210 may also include signature generation algorithms for use in validating digital signatures. In some cases, the memory 210 may be used to store public keys or other additional data used in performing the functions discussed herein.

The computing device 102 may include a querying module 218. The querying module 218 may be configured to execute queries on databases to identify information. The querying module 218 may receive one or more data values or query strings, and may execute a query string based thereon on an indicated database, such as the memory 210, to identify information stored therein. The querying module 218 may then output the identified information to an appropriate engine or module of the computing device 102 as necessary. The querying module 218 may, for example, execute a query on the memory 210 to identify a blockchain transaction that includes a block identifier read from a check 106.

The computing device 102 may also include a validation module 220. The validation module 220 may be configured to validation data for the computing device 102 for use in performing the functions discussed herein. The validation module 220 may receive data to validate as input, may validation the data, and may output a result of the validation to one or more modules or engines of the computing device 102. For example, the validation module 220 may be configured to validate validation values that are read from machine-readable codes displayed on checks 106 by comparing the validation value to a validation value included in a corresponding blockchain transaction. The validation module 220 may also be configured to validate digital signatures, such as by using a public key and a signature algorithm associated therewith. The validation module 220 may be further configured to determine approval or denial of the use of a check 106 in a payment transaction based on the validations of the validation value and digital signature.

The computing device 102 may also include a transaction processing module 222. The transaction processing module 222 may be configured to perform functions associated with the processing of transactions as part of the computing device 102 as discussed herein. For example, the transaction processing module 222 may be configured to tabulate transaction amounts based on selected products, calculate taxes and fees, generate transaction messages, etc.

The computing device 102 may also include a transmitting device 224. The transmitting device 224 may be configured to transmit data over one or more networks via one or more network protocols. In some instances, the transmitting device 224 may be configured to transmit data to blockchain networks 108, processing networks 114, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to blockchain networks 108 that are superimposed or otherwise encoded with requests for blockchain data, which, in some cases, may include a block identifier for which a blockchain transaction is requested. The transmitting device 224 may also be configured to electronically transmit data signals to processing networks 114, which may be superimposed or otherwise encoded with data used in the processing of payment transactions that are funded via check 106, if applicable. In some instances, the transmitting device 224 may be configured to electronically transmit data signals to issuing institutions 110, such as when the validation of a check 106 is unsuccessful.

Process for Secure Approval of a Check Via Blockchain

Figure 3:
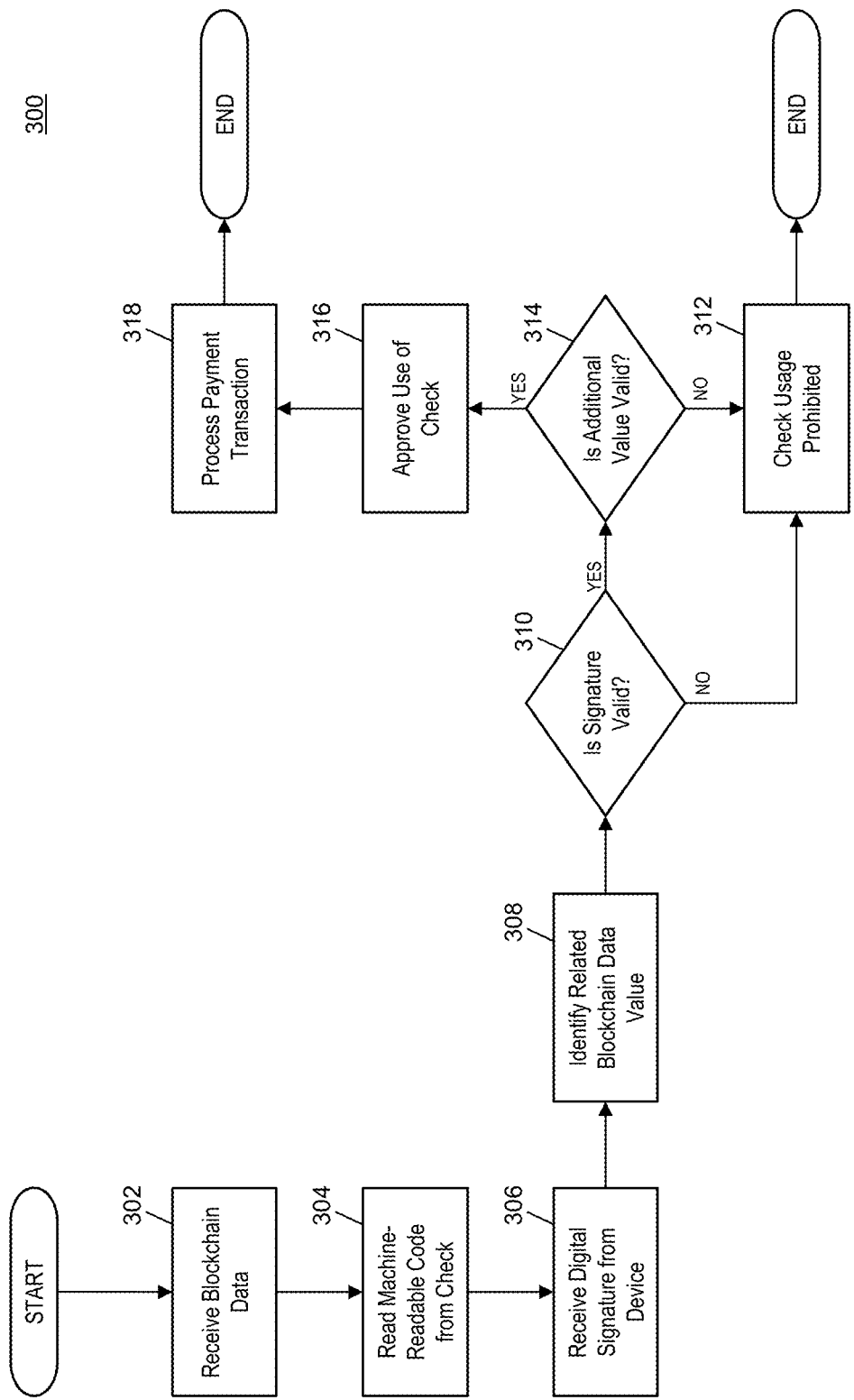
FIG. 3 is a flow diagram illustrating a process for the secure approval of check using a blockchain transaction using the system of FIG. 1 in accordance with exemplary embodiments.

FIG. 3 illustrates an example process executed in the system 100 of FIG. 1 for the approval of the use of a check 106 to fund a payment transaction via a validation value and digital signature in conjunction with the blockchain network 108.

In step 302, the receiving device 202 of the computing device 102 may receive blockchain data from a node in the blockchain network 108. In some embodiments, the querying module 218 of the computing device 102 may execute a query on the memory 210 of the computing device 102 to insert the received blockchain data as the blockchain data 212 stored therein. In step 304, the input device 206 of the computing device 102 may read a machine-readable code printed or otherwise displayed on a check 106 presented for payment and decode at least a validation value and block identifier therefrom. In step 306, the receiving device 202 of the computing device 102 may receive a digital signature electronically transmitted by the mobile device 112 using any suitable communication method.

In step 308, the querying module 218 of the computing device 102 may execute a query on the memory 210 to identify, in the blockchain data 212, a blockchain transaction included therein that includes the block identifier decoded from the machine-readable code displayed on the check 106. In step 310, the computing device 102 may determine if the received digital signature is valid. The validation of the digital signature may be determined by the validation module 220 of the computing device 102 by using a suitable signature validation algorithm and a public key, which may be included in the identified blockchain transaction. If the validation is unsuccessful, then, in step 312, the use of the check 106 may be prohibited. In some embodiments, step 312 may include displaying, on the display device 208 interfaced with the computing device 102, a message to the consumer 104 indicating that the usage of the check 106 was prohibited.

If the validation of the digital signature is valid, then, in step 314, the computing device 102 may determine if the additional value, also referred to herein as the validation value, is valid. The determination may be made by the validation module 220 of the computing device 102, which may attempt to validate the validation value read from the machine-readable code displayed on the check 106 by comparing it to the validation value included in the identified blockchain transaction. If the validation of the additional value is unsuccessful, then the process 300 may proceed to step 312 where the usage of the check 106 is prohibited due to the failed validation. If the validation is successful, then, in step 316, the computing device 102 may approve use of the check 106 for the payment transaction. In step 318, the transaction processing module 222 of the computing device 102 may perform any additional functions, such as those traditionally performed, necessary for the processing of a payment transaction funded via check 106.

Exemplary Method for Secure Approval of a Check

Figure 4:
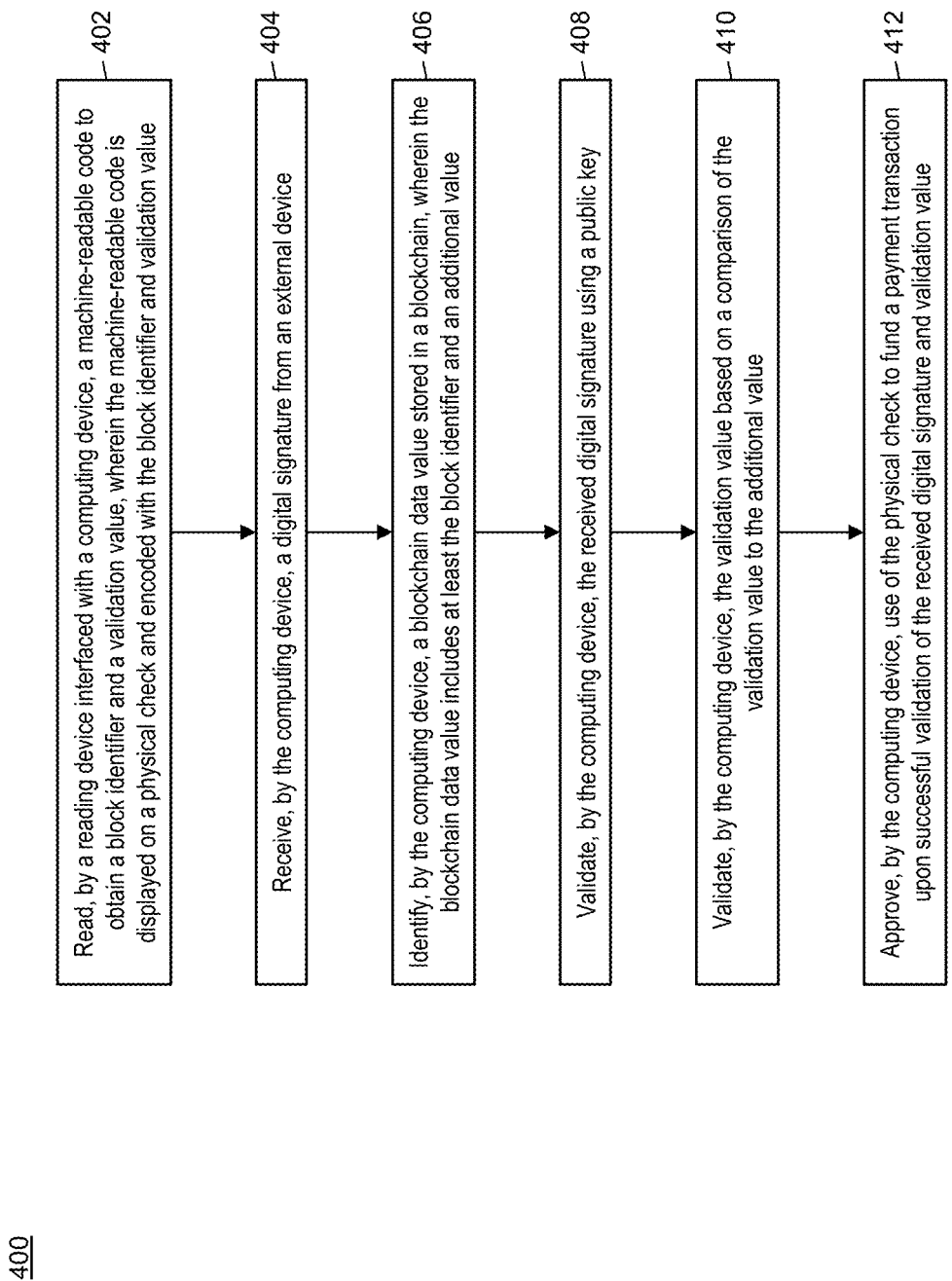
FIG. 4 is a flow chart illustrating an exemplary method for the secure approval of a check using a blockchain transaction in accordance with exemplary embodiments.

FIG. 4 illustrates a method 400 for the secure approval of a check using a validation value and digital signature with a blockchain.

In step 402, a machine-readable code may be read by a reading device (e.g., input device 206) interfaced with a computing device (e.g., the computing device 102) to obtain a block identifier and a validation value, wherein the machine-readable code is displayed on a physical check (e.g., check 106) and encoded with the block identifier and validation value. In step 404, a digital signature may be received (e.g., by the receiving device 202) by the computing device from an external device (e.g., the mobile device 112). In step 406, a blockchain data value stored in a blockchain may be identified by the computing device, wherein the blockchain data value includes at least the block identifier and an additional value.

In step 408, the received digital signature may be validated (e.g., by the validation module 220) by the computing device using a public key. In step 410, the validation value may be validated (e.g., by the validation module 220) by the computing device based on a comparison of the validation value to the additional value. In step 412, use of the physical check to fund a payment transaction may be approved upon successful validation of the received digital signature and validation value.

In one embodiment, the machine-readable code may be a quick response code. In some embodiments, the validation value may be a random number or a pseudo-random number. In one embodiment, the public key may be stored in the blockchain data value. In some embodiments, receiving the digital signature from the computing device may further include receiving the public key from the external device. In one embodiment, the blockchain data value may further include a blockchain address generated using the public key, and the digital signature may be generated using a private key of a cryptographic key pair including the private key and the public key. In some embodiments, the method 400 may further include displaying, on a display device (e.g., a display device 208) interfaced with the computing device, a message indicating the approval of use of the physical check. In one embodiment, the digital signature may be received from the computing device using one of: near field communication, Bluetooth, radio frequency, and magnetic secure transmission.

Computer System Architecture

Figure 5:
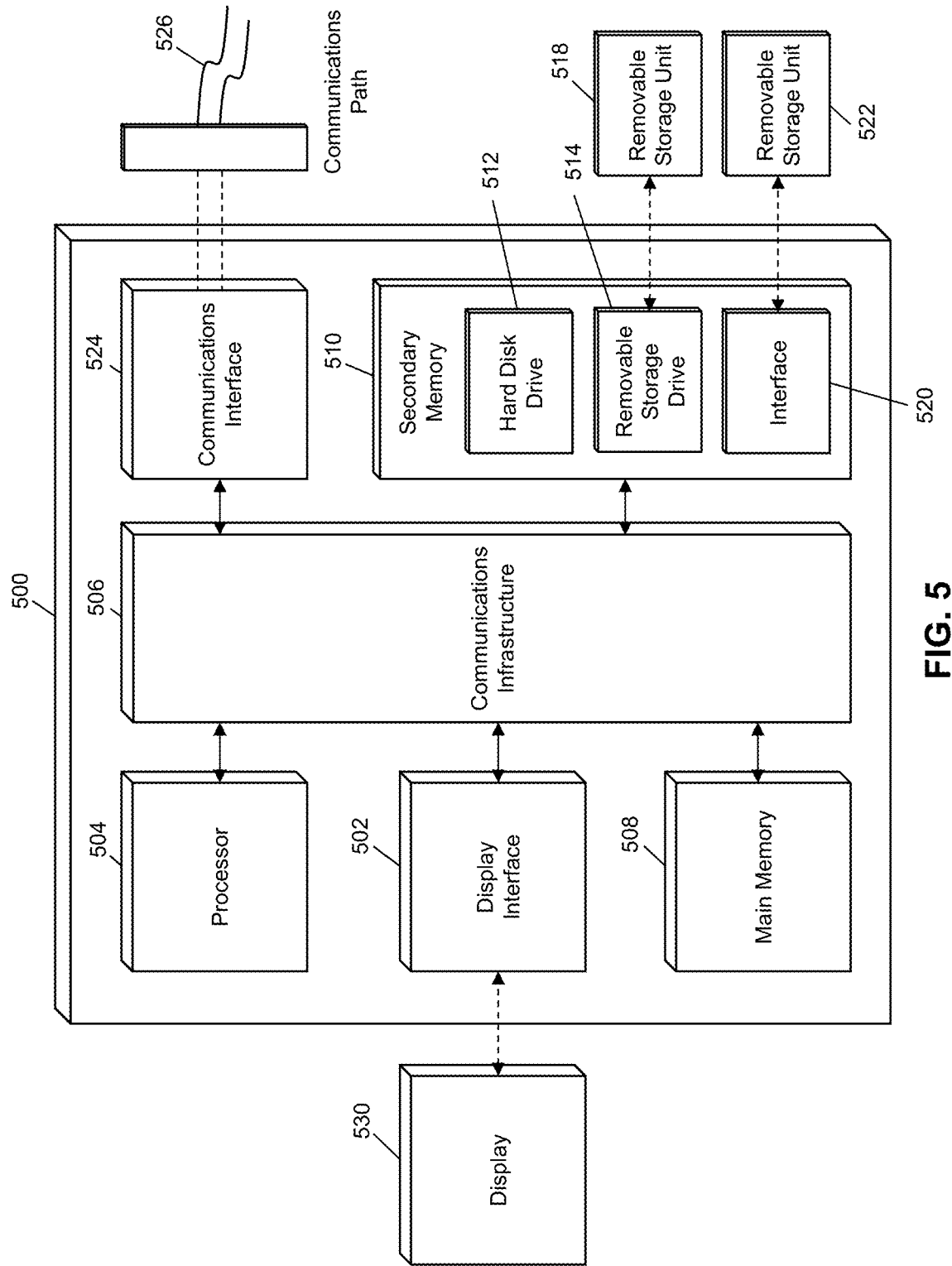
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the computing device 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for securing approval of checks. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for secure approval of a check, comprising:
storing, by a memory of a computing device, blockchain data associated with a blockchain, wherein the blockchain data includes at least a plurality of blocks, each block including at least a block header and one or more transaction values, where each block header includes at least a timestamp, a block reference, and a transaction reference and each transaction value includes data related to an issued check including at least a block identifier, and a validation value;
receiving, by the computing device, a physical check to fund a payment transaction, the physical check including a machine-readable code encoded with a first validation value and a first block identifier, wherein the first block identifier comprises a blockchain address associated with a public key;
reading, by a reading device interfaced with a computing device, the machine-readable code displayed on the physical check;
obtaining, by the computing device and based on the reading, the first validation value and the blockchain address associated with the public key;
receiving, by the computing device, a digital signature from an external device;
identifying, by the computing device, in the blockchain, a blockchain data value, based on the obtained blockchain address associated with the public key, wherein the blockchain data value comprises a second validation value;
determining, by the computing device, that the received digital signature is valid using the public key;
comparing, by the computing device, the obtained first validation value to the identified second validation value;
determining, by the computing device, the obtained first validation value is valid based on the obtained first validation value matching the identified second validation value; and
approving, by the computing device, use of the physical check to fund the payment transaction.

2. The method of claim 1, wherein the machine-readable code is a quick response code.

3. The method of claim 1, wherein the validation value is a random number or pseudo-random number.

4. The method of claim 1, further comprising storing the public key in the blockchain data value.

5. The method of claim 1, wherein receiving the digital signature from the external device further includes receiving the public key from the external device.

6. The method of claim 1, wherein
the blockchain data value further includes the blockchain address, and the method further comprises:
generating the digital signature using a private key of a cryptographic key pair comprising the private key and the public key.

7. The method of claim 1, further comprising:
displaying, on a display device interfaced with the computing device, a message indicating the approval of use of the physical check.

8. The method of claim 1, wherein receiving the digital signature comprises receiving the digital signature from the external device using one of: near field communication, Bluetooth, radio frequency, and magnetic secure transmission.

9. A system for secure approval of a check, comprising:
a computing device comprising:
a processor;
a reading device; and
a memory storing executable instructions, that when executed by the processor, causes the processor to perform the steps of:
storing, by a memory of a computing device, blockchain data associated with a blockchain, wherein the blockchain data includes at least a plurality of blocks, each block including at least a block header and one or more transaction values, where each block header includes at least a timestamp, a block reference, and a transaction reference and each transaction value includes data related to an issued check including at least a block identifier, and a validation value;
receiving, by the computing device, a physical check to fund a payment transaction, the physical check including a machine-readable code encoded with a first validation value and a first block identifier, wherein the first block identifier comprises a blockchain address associated with a public key;
reading, via the reading device the machine-readable code displayed on the physical check;
obtaining, based on the reading, the first validation value and the blockchain address associated with the public key;
receiving a digital signature from an external device, identifying, in the blockchain, a blockchain data value, based on the obtained blockchain address associated with the public key, wherein the blockchain data value comprises a second validation value, determining that the received digital signature is valid using the public key, comparing the obtained first validation value to the identified second validation value, determining the obtained first validation value is valid based on the obtained first validation value matching the identified second validation value, and approving use of the physical check to fund the payment transaction.

10. The system of claim 9, wherein the machine-readable code is a quick response code.

11. The system of claim 9, wherein the validation value is a random number or pseudo-random number.

12. The system of claim 9, wherein execution of the executable instructions further causes the processor to perform storing the public key in the blockchain data value.

13. The system of claim 9, wherein receiving the digital signature from the external device further includes receiving the public key from the external device.

14. The system of claim 9, wherein the blockchain data value further includes the blockchain address, and execution of the executable instructions further causes the processor to perform:

generating the digital signature using a private key of a cryptographic key pair comprising the private key and the public key.

15. The system of claim 9, further comprising a display device, wherein execution of the executable instructions further causes the processor to perform:

displaying, via the display device, a message indicating the approval of use of the physical check.

16. The system of claim 9, wherein receiving the digital signature comprises receiving the digital signature from the external device using one of: near field communication, Bluetooth, radio frequency, and magnetic secure transmission.

17. The method of claim 1, comprising:

determining, by the computing device, the obtained first validation value is not valid based on the obtained first validation value does not match the identified second validation value; and denying, by the computing device, use of the physical check to fund the payment transaction.

18. The system of claim 9, comprising:

determining the obtained first validation value is not valid based on the obtained first validation value does not match the identified second validation value; and denying use of the physical check to fund the payment transaction.

* * * * *